United States Patent Office 3,510,442
Patented May 5, 1970

3,510,442
RUBBERY ALKYL ACRYLATE COPOLYMERS
David Calder Chalmers, Sarnia, Ontario, Canada, assignor to Polymer Corporation Limited, Sarnia, Ontario, Canada, a body corporate and politic
No Drawing. Filed Dec. 23, 1966, Ser. No. 604,131
Claims priority, application Canada, Jan. 17, 1966, 949,961
Int. Cl. C08f 15/40
U.S. Cl. 260—23
12 Claims

ABSTRACT OF THE DISCLOSURE

Solid rubbery copolymers comprise 85 to 99 parts by weight of an alkyl acrylate, either alone or in a mixture with an alkoxyalkyl acrylate or alkylthioalkyl acrylate, 0.1 to 10 parts by weight of a haloalkyl alkenyl compound and 0.1 to 5 parts by weight of an unsaturated monoepoxide compound. Such copolymers have good cure rates and oil-resistance.

---

This invention relates to alkyl acrylate polymers and in particular relates to rubbery copolymers from monomeric mixtures containing a major proportion of alkyl acrylate.

Alkyl acrylate homopolymers, such as polyethyl acrylate, and copolymers such as ethyl acrylate-acrylonitrile copolymer and ethyl acrylate-allyl maleate copolymer containing a minor amount of polymerized comonomer are soft, thermoplastic, rubbery materials which are capable of being cured, i.e. vulcanized to an elastic condition in which they are quite useful for a number of applications because of their resistance to ultraviolet light, ozone, heat, oils, fats, gas diffusion and flexural breakdown.

However, a significant disadvantage of previous acrylate polymers is that whenever an attempt is made to improve low temperature properties, such as by partially replacing a lower molecular weight alkyl acrylate with a higher molecular weight alkyl acrylate in the monomeric mixture, resistance to swelling in oil is adversely affected.

The principle object of this invention is to provide alkyl acrylate copolymers which have a satisfactory rate of cure and a high resistance to oil.

The solid, rubbery copolymer of the present invention is comprised of (a) about 85 to 99 parts by weight of a polymerized monomer selected from (1) alkyl acrylates containing from 5 to 11 carbon atoms, and mixtures of said alkyl acrylates with (2) alkoxy, or (3) alkylthio derivatives of alkyl acrylates, where the alkoxy and alkylthio derivatives each contain from 5 to about 11 carbon atoms, and the alkyl acrylate comprises from about 50 to about 90% by weight of said mixtures, (b) about 0.1 to 10 parts by weight of a haloalkyl alkenyl compound selected from compounds of the structure:

(1) $\quad R-CHX-\underset{\underset{O}{\|}}{C}-O-R'$ (2) $\quad R-CHX-O-\underset{\underset{O}{\|}}{C}-R'$ (3) $\quad R-CHX-O-R'$
and (4) $\quad R-CHX-\underset{\underset{O}{\|}}{C}-R'$ where R is a hydrogen atom or an alkyl radical containing from 1 to 5 carbon atoms, R' is an alkenyl radical containing from 2 to 3 carbon atoms and X is a halogen atom, and (5) reaction products of an α-haloaliphatic monocarboxylic acid with a monoolefinically unsaturated monoepoxide compound of the structure

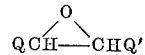

where one of Q and Q' is an unsaturated hydrocarbon compound radical and the other is a hydrogen atom or a saturated hydrocarbon compound radical, said saturated and unsaturated hydrocarbon compound radicals containing from 1 to 7 carbon atoms and optionally containing oxygen in the form of an ester or ether linkage and in the case where two hydrocarbon compound radicals are present they may be linked together to form a cycloaliphatic radical and (c) about 0.1 to 5.0 parts by weight of a monoolefinically unsaturated monoepoxide compound of the structure

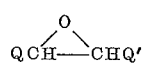

described above.

Examples of the polymerizable alkyl acrylate monomers of (a)(1) above, containing from 5 to 11 carbon atoms, are ethyl acrylate, n-propyl acrylate, isopropyl acrylate, n-butyl acrylate, sec. butyl acrylate, isobutyl acrylate, n-amyl acrylate and the like. The most preferred acrylate is ethyl acrylate since it imparts the optimum balance of properties and is readily available. It is also within the scope of this invention to utilize mixtures of any of the alkyl acrylates. The copolymer may contain about 40 to 99 percent by weight of polymerized alkyl acrylate but the preferred amount is between 60 and 75 percent by weight.

The polymerizable alkoxy alkyl acrylates of (a)(2) above, containing from 5 to 11 carbon atoms, include such compounds as methoxy methyl acrylate, ethoxy methyl acrylate, ethoxy ethyl acrylate, propoxy ethyl acrylate and the like. Ethoxy ethyl acrylate is preferred because of its ready availability and ability to produce superior polymers. The polymerizable alkylthio alkyl acrylates of (a)(3) above, containing 5 to 11 carbon atoms, are exemplified by methylthio ethyl acrylate, ethylthio ethyl acrylate and methylthio butyl acrylate. The presence of the alkoxy or alkylthio alkyl acrylate component greatly improves the low temperature properties of the copolymers of this invention. The copolymer may contain as much as 50 percent by weight of polymerized alkoxy or alkylthio alkyl acrylate, however, the preferred range is between 25 and 40 percent by weight.

The haloalkyl alkenyl compounds, described under the second polymerized component (b) above, may be further characterized as being compounds composed exclusively of carbon, hydrogen, oxygen and halogen atoms and having a single alkenyl radical separated from a haloalkyl radical by an intervening oxygen-containing structure. The significance of this juxtaposition of the alkenyl and haloalkyl radicals lies in the fact that such haloalkyl alkenyl compounds copolymerize with the alkyl acrylates to generate a polymeric chain having haloalkyl radicals as side chains. The haloalkyl radicals in the side chain are separated from the main chain by oxygen-containing radicals selected from

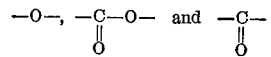

The halogen atom is attached to the alkyl group at the carbon atom adjacent to one of said oxygen-containing radicals. Other halogen-containing alkenyl compounds such as vinyl chloride, vinylidene chloride or vinyl fluoride copolymerize with the alkyl acrylates to produce carbon-to-carbon chains having halogen atoms attached directly to the carbon atoms in the main chain. Alkyl acrylate copolymers having side chain halogen substitution can be cured or vulcanized to a soft, strong and rubber-like condition whereas copolymers of alkyl acrylates with such compounds as vinyl and vinylidene halides produce only weak, brittle vulcanizates of little commercial utility.

Haloalkyl alkenyl compounds include (1) the alkenyl esters of α-haloaliphatic monocarboxylic acids; (2) the α-haloalkyl esters of acrylic acid; (3) the α-haloalkyl alkenyl ethers, (4) the α-haloalkyl alkenyl ketones and (5) the reaction products of an α-haloaliphatic monocarboxylic acid with a monoolefinically unsaturated mono-epoxide compound of the structure

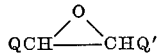

where one of Q and Q' is an unsaturated hydrocarbon compound radical and the other is a hydrogen atom or a saturated hydrocarbon compound radical, said saturated and unsaturated hydrocarbon compound radicals containing from 1 to 7 carbon atoms and optionally containing oxygen in the form of an ester or ether linkage and in the case where two hydrocarbon compound radicals are present, they may be linked together to form a cycloaliphatic radical; all of which have a haloalkyl radical separated from a single alkenyl radical by connecting structure containing oxygen atoms.

The polymerizable alkenyl esters of α-haloaliphatic saturated and unsaturated monocarboxylic acids of (b)(1) and (b)(2), include vinyl chloroacetate, vinyl chloropropionate, vinyl bromoacetate, allyl chloroacetate, allyl bromoacetate and other alkenyl esters of α-halogen-substituted aliphatic monocarboxylic acids, α-chloroethyl acrylate, α-bromoethyl acrylate, α,β-dichloroethyl acrylate, α-chloropropyl acrylate, α-bromopropyl acrylate, α-chlorobutyl acrylate and other haloalkyl esters of acrylic acid. The preferred esters are alkenyl esters of α-halo-substituted aliphatic monocarboxylic acids which contain from 4 to 10 carbon atoms and α-haloalkyl esters of acrylic acid which contain from 4 to 10 carbon atoms.

The polymerizable haloalkyl alkenyl ethers of (b)(3) which are useful in the production of polymers according to this invention include chloromethyl vinyl ether, α-chloroethyl vinyl ether, α-bromoethyl vinyl ether, α,β-dichloroethyl vinyl ether, α-bromo-α-chloroethyl vinyl ether, α-bromo-β-chloroethyl vinyl ether and others, the haloalkyl alkenyl ethers containing from 3 to 9 carbon atoms being preferred.

The haloalkyl alkenyl ketones of (b)(4) which are useful in this invention include α-chloroethyl vinyl ketone, α,β - dichloroethyl vinyl ketone, α - bromo - β-chloropropyl vinyl ketone and other haloalkyl alkenyl ketones, preferably containing from 4 to 10 carbon atoms.

The polymerizable reaction products of (b)(5) include the reaction products of chloroacetic acid and glycidyl acrylate, chloroacetic acid and glycidyl methacrylate, chloroacetic acid and allyl glycidyl ether, chloroacetic acid and vinyl cyclohexene monoxide and others.

The preferred halogen atoms in the haloalkyl group are chlorine and bromine, but fluorine and iodine atoms may also be utilized. It is also within the scope of this invention to utilize mixtures of any of the compounds of (b)(1) to (b)(5). The presence of the polymerized haloalkyl alkenyl compound in the alkyl acrylate copolymer permits the use of alkali metal and ammonium salts of organic acids as curing agents, said salts being preferred to other curing agents of the prior art, such as amines, which have such disadvantage as being toxic, volatile, unpleasant smelling and staining. Examples of such salts, which must be soluble in the copolymer of this invention are sodium carbonate, ammonium acetate, ammonium benzoate, sodium oleate, potassium stearate and the like.

The preferred haloalkyl alkenyl compound is vinyl chloroacetate. The copolymer may contain between about 0.1 and 10 percent by weight of polymerized haloalkyl alkenyl compound but the preferred amount is between 1 and 5 percent by weight.

The third polymerized component, (c) above, is a monoolefinically unsaturated monoepoxide compound of the structure

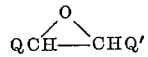

where one of Q and Q' is an unsaturated hydrocarbon compound radical and the other is a hydrogen atom or a saturated hydrocarbon compound radical, said saturated and unsaturated hydrocarbon compound radicals containing from 1 to 7 carbon atoms and optionally containing oxygen in the form of an ester or ether linkage and in the case where two hydrocarbon compound radicals are present, they may be linked together to form a cycloaliphatic radical. It is preferably selected from the group consisting of alkenyl glycidyl monoethers and glycidyl esters of acrylic and methacrylic acids. The copolymer may contain between 0.1 and 5 percent by weight of polymerized epoxide compound, however, the preferred range is between 0.1 and 2.5 percent by weight.

Allyl glycidyl ether is the preferred alkenyl glycidyl ether but related compounds may be employed if desired. The related mono-ether may contain any alkenyl radical such as a vinyl, propenyl, isopropenyl, methallyl, crotyl, 3-butenyl or oleyl radical, for example, there being no restriction on the position of the double bond, the number of carbon atoms or the isomeric structure thereof. As glycidyl radicals there may be present, 1-methyl glycidyl, 1-butyl glycidyl, 2-methyl glycidyl, 2-isopropyl glycidyl, 2-hexyl glycidyl, 3-methyl glycidyl or 3-isopentyl glycidyl radicals, for instance, again there being no restriction on the number of carbon atoms or isomeric configuration thereof. Representative monomers which may be employed as the alkenyl glycidyl mono-ether in preparing the copolymers of the invention include allyl glycidyl mono-ether, methallyl glycidyl mono-ether, crotyl glycidyl mono-ether, vinyl glycidyl mono-ether, isopropenyl glycidyl mono-ether, 4-pentenyl glycidyl mono-ether, allyl - 2 - methyl glycidyl mono - ether, methallyl-3 - isopropyl glycidyl mono -ether, vinyl - 2 - ethyl glycidyl mono - ether, oleyl - 3 - methyl glycidyl mono - ether and the like. A desirable monomer is an alkenyl glycidyl mono-ether having a terminal olefinic double bond which mono-ether contains 6 to 10 carbon atoms.

Of the glycidyl esters which may be employed in the preparation of the novel polymers of this invention, glycidyl methacrylate is preferred, but related compounds may be employed if desired. It is also within the scope of this invention to utilize mixtures of any of the alkenyl glycidyl mono-ethers and/or the glycidyl esters of acrylic and methacrylic acid.

In the practice of the present invention, monomeric mixtures containing one or more monomers from each of the three essential monomer classes, (a), (b) and (c) disclosed, are prepared and subjected to polymerization. While the proportions of each of the three essential monomers in the monomeric mixture may vary somewhat, such variation must be within certain definite limits in order to product rubbery copolymers. For example, the monomeric mixture must contain (a) from about 85 to 99 parts by weight of one or more of the alkyl acrylates, or mixtures of said acrylates with alkoxy or alkylthio derivatives of alkyl acrylates, the alkyl acrylate comprising about 50 to 90 percent by weight of such a mixture, (b) from 0.1 to 10 parts by weight of one or more of the haloalkyl alkenyl compounds, and (c) from 0.1 to 5 parts by weight of one or more of the aliphatically unsaturated epoxy compounds herein described. It is preferred that the mixture contain from 60 to 75 percent by weight of alkyl acrylate, 25 to 40 percent of the alkoxy or alkylthio alkyl acrylate, 1 to 5% of the haloalkyl alkenyl compound and 0.1 to 2.5% of the mono-epoxide compound. If the alkoxy or alkylthio compound is present in an amount greater than 50 percent, a copolymer is obtained which is deficient in stress-strain properties and in ease of processing while if less than 10 percent is utilized, no significant improvement in low temperature properties is obtained. If the haloalkyl compound is present in an amount greater than 10 percent, a copolymer is obtained which tends to "scorch" or vulcanize prematurely and is deficient in low temperature properties while if less than 0.1 percent of this type of monomer is utilized, the resulting copolymer is difficult to cure. If greater than 5 percent of the epoxy compound is utilized, the resulting copolymer tends to scorch while if less than 0.1 percent is employed, no significant improvement in cure rate is obtained.

The most preferred polymer of this invention is comprised of ethyl acrylate, ethoxy ethyl acrylate, vinyl chloroacetate and allyl glycidyl ether. Such a polymer is particularly useful in the vulcanized state in such applications as oil seals in automotive transmissions wherein the rubber seals are subjected to hypoid lubricants at high temperatures.

The polymerization of the above monomer mixtures may be effected by a number of known methods. For example, polymerization may be effected in solution or in a bulk system by the application of heat or actinic light with or without the presence of peroxygen compounds known to initiate polymerization. It is preferred, however, to carry out polymerization of the monomeric mixture in an aqueous emulsion in the presence of an emulsifying agent, a polymerization initiator and, if desired, a polymerization modifier.

Emulsifying agents which may be employed in the aqueous emulsion process includes the fatty acid soaps such as sodium oleate, sodium palmitate and the like, the high molecular weight aliphatic sulfates and the aryl and alkaryl sulfonates such as sodium lauryl sulfate, sodium isopropyl naphthalene sulfonate, and the like as well as the salts of high molecular weight bases such as the hydrochloride or diethylaminoethyloleylamide, cetyltrimethyl ammonium methyl sulfate and lauryl amine hydrochloride.

Polymerization catalysts and initiators useful in any of the polymerization processes include benzoyl peroxide, sodium, potassium and ammonium persulfate, hydrogen peroxide, cumene hydroperoxide, and other peroxygen compounds as well as other types of polymerization initiators such as diazoamino benzene. Those soluble in hydrocarbons are, of course, preferred in the solution or bulk methods while those soluble in water are often preferred in the emulsion method of polymerization.

Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and alkacrylates and may be advantageously employed when a very soft polymer is desired.

In the polymerization of the monomeric mixtures of this invention, permissible reaction temperatures may vary from as high as 100° C. or even higher down to 0° C. or even as low as −10 or −20, though the temperature preferably used is in the range of 20 to 80° C. In aqueous emulsion with temperatures of 20 to 80° C., it is possible to obtain quantitative yields of polymer in from about 1 to about 15 hours.

The preparation of the copolymers of this invention will be more clearly demonstrated in the following examples.

EXAMPLE I

| | Parts |
|---|---|
| Ethyl acrylate | 74.0 |
| Ethoxy ethyl acrylate | 24.0 |
| Vinyl chloroacetate | 2.0 |
| Glycidyl methacrylate | 0.5 |
| Sodium alkyl aryl sulfonate | 3.0 |
| $Na_2S_2O_4$ | 0.03 |
| $K_2S_2O_8$ | 0.3 |
| $Na_2B_4O_7 \cdot 10H_2O$ | 1.0 |
| Water | 250.0 |

A mixture of ethyl acrylate, ethoxy ethyl acrylate, vinyl chloroacetate and glycidyl methacrylate was charged over a period of 4 hours to an oxygen-free reactor containing the remaining polymerization ingredients and equipped with an agitator. The polymerization was continued at 50° C. for a further 4 hours when 0.003 parts of sodium dimethyldithiocarbamate were added. The latex was heated under reduced pressure to remove any unreacted monomers and then coagulated by the addition of a 6 percent aqueous solution of sodium chloride.

The polymer was mixed on a two-roll mill in the compounding recipe given below.

| | Parts |
|---|---|
| Acrylate copolymer | 100 |
| SRF carbon black | 50 |
| Stearic acid | 1 |
| Phenyl β-naphthylamine | 2 |
| Sodium stearate | 2.4 |
| Potassium stearate | 0.6 |
| Sulfur | 0.3 |

The vulcanizate was tested for certain physical properties after having been subjected to one of the conditions given below:

(a) After initial cure for 20 minutes and post cure of 4 hours at 150° C.;

(b) After post cure and ageing for 70 hours at 150° C. in ASTM Hydrocarbon Test Fluid;

(c) After post cure and ageing in air for 35 hours at 175° C.;

(d) After post cure and ageing in air for 70 hours at 175° C.; and (e) After post cure and ageing in air for 100 hours at 175° C.

ASTM Hydrocarbon Test Fluid is composed of 92 percent by weight of ASTM Oil #1 and 8 percent of a particular additive. Said additive is a hydrocarbon composition containing sulfur and chlorine constituents of controlled activity towards metal surfaces. Said additive contains a minimum of 30 percent by weight of chlorine and 6 percent by weight of sulfur.

The letters a–e inclusive, are used as abbreviations in this and other examples to indicate the conditions to which test specimens were subjected before physical properties were measured. The vulcanizate properties of the polymer are summarized in Table I.

TABLE I

| Property | Treatment | |
|---|---|---|
| Tensile strength (kg./cm.²) | a | 101 |
|  | b | 96 |
|  | c | 94 |
|  | e | 91 |
| Elongation (percent) | a | 205 |
|  | b | 250 |
|  | c | 190 |
|  | e | 180 |
| Shore A-2 Hardness | a | 50 |
|  | b | 50 |
|  | c | 53 |
|  | e | 55 |
| Volume increase (percent) | b | 3.8 |
| Gehman T-10 (° C.) | a | −21.2 |

Gehman T–10 is the temperature at which the torsional modulus is ten times greater than the torsional modulus at room temperature.

These results indicate that vulcanizates of the polymer of the present invention have good tensile strength, hardness, resistance to ageing in air, resistance to swelling in oil and low temperature properties. This copolymer has better low temperature properties than those of the ethyl acrylate-chloroethyl vinylether copolymer which has a Gehman T–10 value of −12° C.

EXAMPLE II

The procedure of Example I was repeated, except that 49.0 parts of ethyl acrylate and 49.0 parts of ethoxy ethyl acrylate were used in the polymerization recipe. The physical properties were measured and are reported in Table II.

TABLE II

| Property | Treatment | |
|---|---|---|
| Tensile strength (kg./cm.²) | a | 76 |
| | b | 88 |
| | c | 74 |
| | e | 72 |
| Elongation (percent) | a | 200 |
| | b | 340 |
| | c | 190 |
| | e | 165 |
| Shore A-2 Hardness | a | 44 |
| | b | 41 |
| | c | 46 |
| | e | 52 |
| Volume Increase (percent) | b | −3.0 |
| Gehman T–10 (° C.) | a | −31.5 |

These results indicate that an increase in ethoxy ethyl acrylate content from 24 parts by weight in the previous example to the present 49 parts by weight improved the low temperature properties of the vulcanizate. The cure rate of the compound and the resistance to swelling in oil of the vulcanizate were satisfactory.

EXAMPLE III

The procedure of Example I was repeated, except that glycidyl methacrylate was replaced by allyl glycidyl ether. The proportions of monomers were approximately the same being ethyl acrylate 68.0 parts, ethoxy ethyl acrylate 29.0 parts, vinyl chloroacetate 2.0 parts and allyl glycidyl ether 0.5 parts. The physical properties of the vulcanizate were measured and are summarized in Table III.

TABLE III

| Property | Treatment | |
|---|---|---|
| Tensile strength (kg./cm.²) | a | 79 |
| | b | 79 |
| | c | 71 |
| | e | 62 |
| Elongation (percent) | a | 485 |
| | b | 450 |
| | c | 440 |
| | e | 400 |
| Shore A-2 hardness | a | 35 |
| | b | 30 |
| | c | 35 |
| | e | 35 |
| Volume increase (percent) | b | 0.0 |
| Gehman T–10 (° C.) | a | −26.0 |

These results show that the substitution of allyl glycidyl ether for glycidyl methacrylate resulted in a copolymer having good vulcanizate properties.

EXAMPLE IV

The procedure of Example I was repeated, except that the amount of vinyl chloroacetate was varied. The monomer proportions are given below.

| | Sample 1 | Sample 2 |
|---|---|---|
| Ethyl acrylate | 72.0 | 71.0 |
| Ethoxy ethyl acrylate | 24.0 | 24.0 |
| Vinyl chloroacetate | 4.0 | 5.0 |
| Glycidyl methacrylate | 0.5 | 0.5 |

Vulcanizate properties are presented in Table IV.

TABLE IV

| Property | Treatment | Sample 1 | Sample 2 |
|---|---|---|---|
| Tensile strength (kg./cm.²) | a | 81 | 99 |
| | b | 94 | 86 |
| | c | 94 | 86 |
| | e | 74 | 82 |
| Elongation (percent) | a | 160 | 190 |
| | b | 270 | 220 |
| | c | 145 | 210 |
| | e | 110 | 160 |
| Shore A-2 hardness | a | 51 | 48 |
| | b | | 44 |
| | c | 55 | 48 |
| | e | 58 | 53 |
| Volume increase (percent) | b | −3.0 | −2.3 |
| Gehman T–10 (° C.) | a | −19.0 | −22.5 |

These results, in conjunction with those of Example I, show that a vinyl chloroacetate content of between 2 and 5 parts by weight imparted a good balance of vulcanizate properties.

EXAMPLE V

The procedure of Example III was repeated, except that the concentration of allyl glycidyl ether was varied. The monomer proportions are given below.

| | Sample 1 | Sample 2 |
|---|---|---|
| Ethyl acrylate | 69.0 | 68 |
| Ethoxy ethyl acrylate | 29.0 | 29 |
| Vinyl chloroacetate | 2.0 | 2.0 |
| Allyl glycidyl ether | 0 | 1.0 |

The vulcanizate properties of the polymers were measured and are summarized in Table V.

TABLE V

| Property | Treatment | Sample 1 | Sample 2 |
|---|---|---|---|
| Tensile strength (kg./cm.²) | a | 111 | 80 |
| | b | 131 | 104 |
| | c | 72 | 77 |
| | e | 49 | 72 |
| Elongation (percent) | a | 405 | 470 |
| | b | 490 | 280 |
| | c | 430 | 380 |
| | e | 450 | 370 |
| Shore A-2 hardness | a | 37 | 33 |
| | b | 47 | 50 |
| | c | 36 | 38 |
| | e | 36 | 41 |
| Volume increase (percent) | b | −3.0 | −3.0 |
| Gehman T–10 (° C.) | a | −26.0 | −26.0 |

These results indicate that as the allyl glycidyl ether content of the copolymer is increased from 0.0 to 1.0 part vulcanizate resistance to ageing in air is improved.

EXAMPLE VI

The procedure of Example I was repeated, except that ethoxy ethyl acrylate was replaced by methoxy ethyl acrylate. The proportions of monomers are given below.

Ethyl acrylate _____ 49.0
Methoxy ethyl acrylate _____ 49.0
Vinyl chloroacetate _____ 2.0
Glycidyl methacrylate _____ 0.5

Vulcanizate properties are presented in Table VI.

TABLE VI

| Property | Treatment | |
|---|---|---|
| Tensile strength (kg./cm.²) | a | 129 |
| | b | 125 |
| | d | 115 |
| Elongation (percent) | a | 100 |
| | b | 110 |
| | d | 105 |
| 100% modulus (kg./cm.²) | a | 129 |
| | b | 97 |
| | d | 112 |
| Volume increase (percent) | b | −1.5 |
| Gehman T–10 (° C.) | a | −21.0 |

These results show that the presence of copolymerized methoxy ethyl acrylate in the copolymer improves tensile strength and imparts acceptable low temperature properties.

EXAMPLE VII

The procedure of Example I was repeated, except that ethoxy ethyl acrylate was omitted and vinyl chloroacetate was replaced by the reaction product of glycidyl methacrylate and chloroacetic acid. The monomer proportions are given below.

Ethyl acrylate _____ 97.5
Reaction product of glycidyl methacrylate and
 chloroacetic acid _____ 2.0
Glycidyl methacrylate _____ 0.5

The physical properties of the vulcanizate were measured and are summarized in Table VII.

TABLE VII

| Property | Treatment | |
|---|---|---|
| Tensile strength (kg./cm.$^2$) | a | 174 |
| | b | 181 |
| | d | 179 |
| Elongation (percent) | a | 250 |
| | b | 285 |
| | d | 180 |
| 100% modulus (kg./cm.$^2$) | a | 45 |
| | b | 40 |
| | d | 91 |
| Volume increase (percent) | b | 2.0 |
| Gehman T-10 (° C.) | a | −12.0 |

These results indicate that the above copolymer has a good rate of cure and high tensile strength.

EXAMPLE VIII

The procedure of Example I was repeated, except that ethoxy ethyl acrylate was omitted and vinyl chloroacetate was replaced by the reaction product of glycidyl acrylate and chloroacetic acid. The proportions of monomers are given below.

Ethyl acrylate _____ 98.3
Reaction product of glycidyl acrylate and chloro
 acetic acid _____ 1.1
Glycidyl acrylate _____ 0.6

Vulcanizate properties are presented in Table VIII.

TABLE VIII

| Property | Treatment | |
|---|---|---|
| Tensile strength (kg./cm.$^2$) | a | 158 |
| | b | 156 |
| | d | 150 |
| Elongation (percent) | a | 300 |
| | b | 300 |
| | d | 220 |
| 100% modulus (kg./cm.$^2$) | a | 40 |
| | b | 30 |
| | d | 57 |
| Volume increase (percent) | b | 2.0 |
| Gehman T-10 (° C.) | a | −12.0 |

These results show that the above copolymer had a good rate of cure and high tensile strength.

What is claimed is:

1. A solid, rubbery copolymer comprising about 85 to 99 parts by weight of a polymerized monomer (a) selected from (1) alkyl acrylates containing from 5 to 11 carbon atoms, and mixtures of said alkyl acrylates with (2) alkoxy or (3) alkylthio derivatives of alkyl acrylates, where the alkoxy and alkylthio derivatives each contain from 5 to about 11 carbon atoms, and the alkyl acrylate comprises from about 50 to about 90 percent by weight of said mixtures, about 0.1 to 10 parts by weight of a haloalkyl alkenyl compound (b) selected from compounds of the structure:

(1) 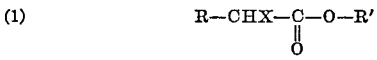

(2) 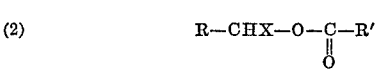

(3) 

and (4) 

where R is selected from a hydrogen atom and an alkyl radical containing from 1 to 5 carbon atoms, R' is an alkenyl radical containing from 2 to 3 carbon atoms and X is a halogen atom, and (5) reaction products of an α-halo aliphatic monocarboxylic acid with a monoolefinically unsaturated monoepoxide compound having the structure selected from (i)

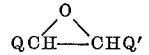

where one of Q and Q' is an unsaturated $C_2$–$C_7$ hydrocarbon compound radical and the other is selected from the group consisting of a hydrogen atom, a saturated $C_2$–$C_7$ hydrocarbon compound radical, an unsaturated $C_2$–$C_7$ hydrocarbon compound radical, a $C_2$–$C_7$ saturated hydrocarbon compound radical containing an oxygen atom in the form of an ester linkage, a $C_2$–$C_7$ saturated hydrocarbon compound radical containing an oxygen atom in the form of an ether linkage, a $C_2$–$C_7$ unsaturated hydrocarbon compound radical containing oxygen in the form of an ester linkage and a $C_2$–$C_7$ unsaturated hydrocarbon compound radical containing an oxygen atom in the form of an ether linkage, and (ii)

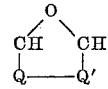

where Q and Q' together form a divalent $C_2$–$C_{14}$ unsaturated hydrocarbon compound radical and about 0.1 to 5.0 parts by weight of a monoolefinically unsaturated monoepoxide compound (c) of the structure described above, said polymer prepared in the presence of peroxygen compound.

2. The copolymer of claim 1 in which the alkyl acrylate is ethyl acrylate.

3. The copolymer of claim 1 in which the haloalkyl alkenyl compound (b) is selected from vinyl chloroacetate, the reaction product of glycidyl methacrylate with chloroacetic acid and the reaction product of glycidyl acrylate with chloroacetic acid.

4. The copolymer of claim 1 in which the monoepoxide compound (c) is selected from allyl glycidyl ether and glycidyl methacrylate.

5. The copolymer of claim 1 in which the polymerized monomer (a) is ethyl acrylate and the haloalkyl alkenyl compound (b) is the reaction product of glycidyl methacrylate with chloroacetic acid and the monoepoxide compound (c) is glycidyl methacrylate.

6. The copolymer of claim 1 in which the polymerized monomer (a) is ethyl acrylate and the haloalkyl alkenyl compound (b) is the reaction product of glycidyl acrylate with chloroacetic acid and the monoepoxide compound (c) is glycidyl acrylate.

7. The composition comprising a compounded and vulcanized homogeneous admixture of the copolymer of claim 1 with a vulcanizing agent, said vulcanizing agent being selected from sodium and potassium salts of saturated aliphatic monocarboxylic acids, said acids containing from 12 to 18 carbon atoms.

8. A solid rubbery copolymer comprising about 85–99 parts by weight of a mixture (a) of polymerized monomers, said mixture comprising from about 50 to about 90 percent by weight of said mixture of (1) an alkyl acrylate and from about 50 to about 10 percent by weight of (2) an alkoxyalkyl or (3) alkylthioalkyl acrylate, said acrylates (1), (2) and (3) containing from 5 to about 11 carbon atoms, about .1 to 10 parts by weight of a haloalkyl alkenyl compound (b) selected from compounds of the structure:

(1)  $\text{R—CHX—}\underset{\underset{\text{O}}{\|}}{\text{C}}\text{—O—R}'$ (2)  $\text{R—CHX—O—}\underset{\underset{\text{O}}{\|}}{\text{C}}\text{—R}'$ (3)  $\text{R—CHX—O—R}'$ and (4)  $\text{R—CHX—}\underset{\underset{\text{O}}{\|}}{\text{C}}\text{—R}'$ where R is selected from a hydrogen atom and an alkyl radical containing from 1 to 5 carbon atoms, R' is an alkenyl radical containing from 2 to 3 carbon atoms and X is a halogen atom, and (5) reaction products of an α-halo aliphatic monocarboxylic acid with a monoolefinically unsaturated monoepoxide compound having the structure selected from (i)

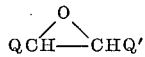

where one of Q and Q' is an unsaturated $C_2$–$C_7$ hydrocarbon compound radical and the other is selected from the group consisting of a hydrogen atom, a saturated $C_1$–$C_7$ hydrocarbon compound radical, an unsaturated $C_2$–$C_7$ hydrocarbon compound radical, a $C_1$–$C_7$ saturated hydrocarbon compound radical containing an oxygen atom in the form of an ester linkage, a $C_1$–$C_7$ saturated hydrocarbon compound radical containing an oxygen atom in the form of an ether linkage, a $C_2$–$C_7$ unsaturated hydrocarbon compound radical containing oxygen in the form of an ester linkage and a $C_2$–$C_7$ unsaturated hydrocarbon compound radical containing an oxygen atom in the form of an ether linkage, and (ii)

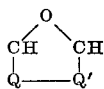

where Q and Q' together form a divalent $C_2$–$C_{14}$ unsaturated hydrocarbon compound radical, and about 0.1 to 5.0 parts by weight of a monoolefinically unsaturated monoepoxide compound (c) of the structure described above.

9. The copolymer of claim 8 in which the alkoxy derivative of alkyl acrylate is selected from ethoxy ethyl acrylate and methoxy ethyl acrylate.

10. The copolymer of claim 8 in which the alkyl acrylate is ethyl acrylate, the alkoxy derivative of the alkyl acrylate is ethoxy ethyl acrylate, the haloalkyl alkenyl compound (b) is vinyl chloroacetate and the monoepoxide compound (c) is glycidyl methacrylate.

11. The copolymer of claim 8 in which the alkyl acrylate is ethyl acrylate, the alkoxy derivative of the alkyl acrylate is ethoxy ethyl acrylate, the haloalkyl alkenyl compound (b) is vinyl chloroacetate and the monoepoxide compound (c) is allyl glycidyl ether.

12. The copolymer of claim 8 in which the alkyl acrylate is ethyl acrylate, the alkoxy derivative of the alkyl acrylate is methoxy ethyl acrylate, the haloalkyl alkenyl compound (b) is vinyl chloroacetate and the monoexpoxide compound (c) is glycidyl methacrylate.

References Cited

UNITED STATES PATENTS

| 3,223,670 | 12/1965 | Cantor et al. | 260—80.72 |
| 3,312,677 | 4/1967 | Rosa | 260—80.72 |
| 2,492,170 | 12/1949 | Mast et al. | 260—80.76 |
| 2,568,659 | 9/1951 | Powell | 260—80.76 |
| 3,288,763 | 11/1966 | Waldron | 260—86.1 |
| 3,431,245 | 3/1969 | Scherf et al. | 260—86.1 |

DONALD E. CZAJA, Primary Examiner

D. J. BARRACK, Assistant Examiner

U.S. Cl. X.R.

260—79.7, 80.72, 80.76, 80.81, 86.1, 884